(12) United States Patent
Tan

(10) Patent No.: US 8,325,235 B1
(45) Date of Patent: Dec. 4, 2012

(54) LIGHTWEIGHT COMPACT PORTABLE SURVEILLANCE SYSTEMS

(75) Inventor: Seng Tan, Beavercreek, OH (US)

(73) Assignee: Wright Materials Research, Co., Beaver Creek, OH (US)

(*) Notice: Subject to any disclaimer, the term of this patent is extended or adjusted under 35 U.S.C. 154(b) by 447 days.

(21) Appl. No.: 12/589,757

(22) Filed: Oct. 28, 2009

(51) Int. Cl.
*H04N 5/225* (2006.01)

(52) U.S. Cl. ........ 348/169; 348/143; 348/149; 348/158; 348/159

(58) Field of Classification Search ............ 348/61, 348/143, 148, 158, 159, 373, E7.001, E7.085, 348/E7.088
See application file for complete search history.

(56) References Cited

U.S. PATENT DOCUMENTS

| | | | |
|---|---|---|---|
| 2004/0123328 A1* | 6/2004 | Coffey et al. | 725/105 |
| 2004/0135879 A1* | 7/2004 | Stacy et al. | 348/14.02 |
| 2010/0277591 A1* | 11/2010 | Kowalsky | 348/158 |

* cited by examiner

*Primary Examiner* — LaShonda Jacobs

(57) ABSTRACT

An arm or chest mount portable surveillance system utilizing a compact LCD display (monitor), batteries, a telescoping pole having a camera at one extremity thereof, a short at least partially flexible pole having a camera at one extremity thereof, and a recorder are described. The system allows users to observe objects and activities around and through obstacles in under any ambient light condition including in darkness through the use of an infrared camera.

11 Claims, 2 Drawing Sheets

LIGHTWEIGHT COMPACT PORTABLE SURVEILLANCE SYSTEMS

FIELD OF THE INVENTION

The present invention relates to surveillance systems and more particularly to such systems that are readily man portable.

BACKGROUND OF THE INVENTION

Surveillance systems have been used for SWAT, bomb squad, military operators, and civilians for many years. Numerous innovations have been made for individual components over the past decade. For examples, US 2009/0175032 A9 and U.S. Pat. No. 7,581,852 B2 developed telescopic lens with enhanced searching capability. Most of the inventions in the subject of portable surveillance systems are focused on camera and viewing capability enhancement. Some inventions with the term "portable" may include apparatus that can be carried by vans or small trucks. Some compact surveillance systems are mounted on the exterior of buildings, walls, furniture; and small articles like phones, pictures. Since they are stationary weight is not a concern.

Both weight and size of the surveillance system are very important for SWAT, bomb squad, and military operations. Portable surveillance systems are used by these agencies to observe objects and activities in locations that are not conveniently observed without the use of specialized devices. Without exposing the user, the surveillance system allows the user to observe objects and activities around corners, inside of a room, outside of a room, or into the second story or basement of a building through a window from the ground level. Soldiers may use a portable surveillance systems in urban warfare. For civilian applications, animal controllers use surveillance systems to observe animals in a hole, cave, attic, tunnel, or on a roof. Miners use a surveillance system to examine the integrity and safety of a cave and wall before entering. Civilians may use surveillance systems to inspect damage to the roof or other part of a building that may be unsafe to approach. For most of these applications weight and compactness are desirable features of any portable surveillance system.

Currently, the most commonly surveillance system used by law enforcement officers and soldiers involved in urban warfare are back mounted and chest mounted systems. Both systems include a LCD display (monitor) and batteries in a carrier, and a pole camera connected to the display by electrical wires. These back mounted surveillance system generally require two people to use. In such applications, the person carrying the surveillance system is required to hold a gun in his/her hand while the person behind carrier observes a monitor and lets the carrier know what he/she sees. Such systems are inconvenient for soldiers to use in the battlefield. Since SWAT, bomb squad and military operations all involve with rapid movement there is a concern that electrical wires may cause entanglement. For bomb squad applications, the pole camera must have sufficient length (over 12-ft) for safety reason.

Thus, there remains a need for a compact single man portable and useable surveillance system that eliminates or greatly curtails these shortcomings of currently available so-called "portable" surveillance systems.

OBJECT OF THE INVENTION

It is an object of the present invention to provide a compact single man portable and useable surveillance system that eliminates or greatly curtails these shortcomings of currently available so-called "portable" surveillance systems.

SUMMARY OF THE INVENTION

According to the present invention there are provided an arm or chest mount portable surveillance system utilizing a compact LCD display (monitor), batteries, a long telescoping pole having a camera at one extremity thereof, a short at least partially flexible pole having a camera at one extremity thereof, and a recorder are described. The system allows users to observe objects and activities around and through obstacles in under any ambient light condition including in darkness through the use of an infrared camera.

DETAILED DESCRIPTION

The main objective of the instant invention is the design and construction a family of lightweight compact surveillance systems. A chest mount and an arm mount surveillance system have been developed and constructed based on the same principle. These systems are designed to include functions most suitable for SWAT, bomb squad, and military applications. The secondary objective is for civilian applications including animal controllers, mine workers, firefighters, and common people.

Figure 1:
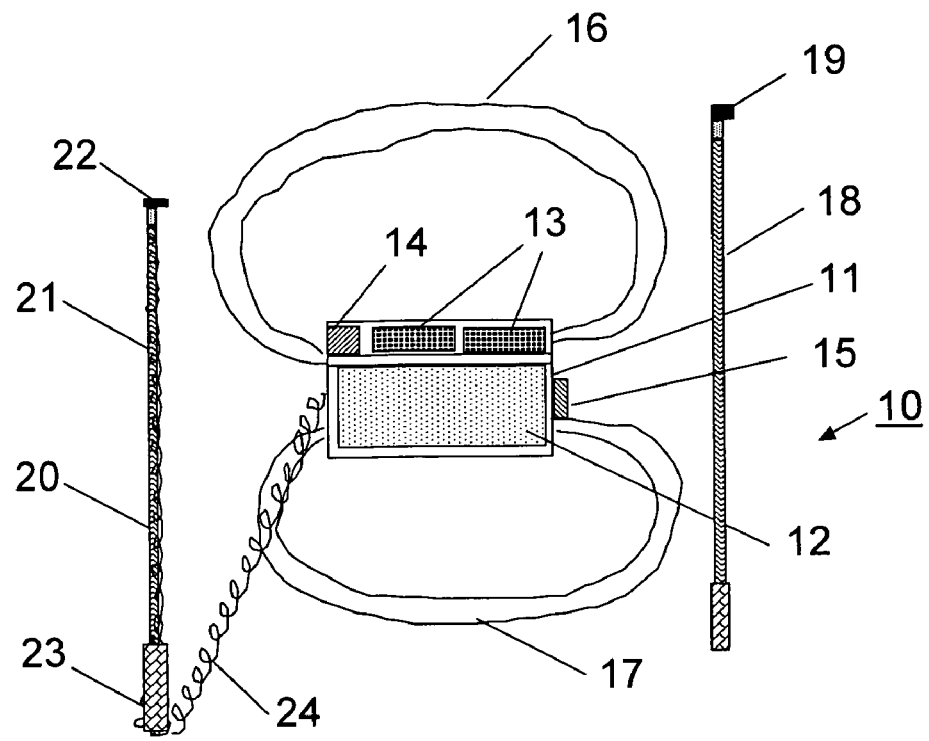
FIG. 1 is a schematic representation of a chest mount surveillance system in accordance with the present invention.

Referring now to the accompanying drawings, FIG. 1 represents one preferred embodiment of a chest mount surveillance system 10 in accordance with the present invention. Enclosure 11 comprises an LCD display (monitor) 12, two sets of rechargeable batteries 13, a battery monitor 14, and a recorder 15, a neck/shoulder strap 16, a back strap 17, a telescoping pole 18 that carries a compact camera 19 on its tip, a shorter flexible pole 20 that carries a compact camera 22 on its tip and a handle 23. Although the display can be in any practical size it is preferably larger than 1 by 2-in and less than 8 by 16-in. Preferably the brightness of the monitor can be controlled so that it is not be too bright in low light conditions but is readily readable in sunlight. The rechargeable battery should provide the power need for at least one hour. Telescoping pole 18 is preferably at least 7-ft, and more preferably over 12-ft in its fully extended position. It uses a wireless camera 19 that is powered by a rechargeable battery and a battery monitor. Since this telescoping pole is at least 7 to 12-ft long in its fully extended configuration, any electrical wire used would have to be over 15-ft long. This long wire with telescoping pole 18 in its collapsed position could easily result in entanglement. Therefore, a wireless compact camera 19 with a diameter less than 2-in, preferably less than 1-in, is used in the instant invention. Shorter pole 20 preferably includes at least one flexible section so that the user can position camera 22 at any angle and any direction conveniently. Camera 22 can be wired to the monitor or use a wireless connection. In the case of a wired camera electrical wire 24 should be between 2 and 7 feet long. To minimize entanglement wire 24 should not be longer than about 7-ft. In the case of a wireless camera it is powered by a rechargeable battery.

Telescoping pole 18 is preferably manufactured from tubes with a diameter between 0.5 and 2-in. In its stowed or collapsed position the smaller tubes are stored inside the cavities of the larger tubes. The collapsed length of the telescoping pole 18 is basically the length of the largest tube. There is no requirement of the thickness of the tube. However, the pole needs to have some rigidity in its extended position so that camera 19 can be manipulated in a controlled manner. There is no requirement of the cross-sectional shape of telescoping pole 18. Weight and rigidity are the main requirements for telescoping pole 18. Telescoping pole 18 can be manufactured from carbon fiber reinforced resin composite, glass or aramid fiber reinforced resin composite, aluminum alloys, or any other lightweight metallic alloy or hybrid composite system involving metals, polymers, ceramics, and intermetallics. Preferably, the surfaces are not shiny and are darker in color.

Figure 2:
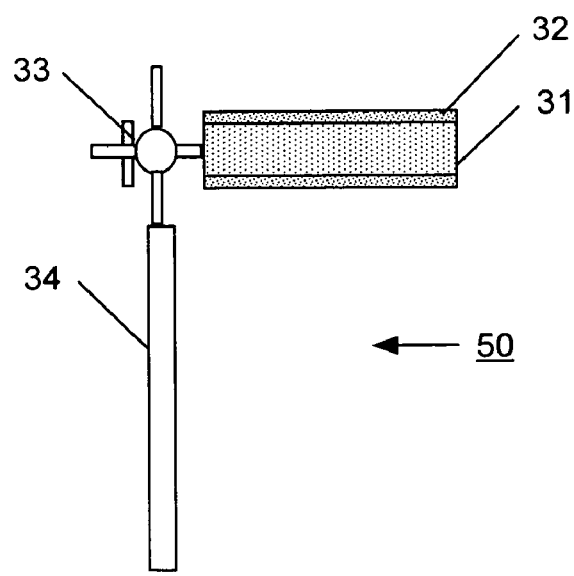
FIG. 2 shows the packaging of the compact telescoping camera of the present invention.

Cameras 19 and 22 should be protected from impact damage due to the potential for use of the device in adverse conditions. For this reason, as depicted in FIG. 2 according to one preferred embodiment 50 of this invention camera 31 is covered with a layer of impact resistant material such as polymer or elastomeric foam 32. Alternatively, the camera can be covered and protected by a layer of elastomeric or soft material. A swivel joint 33 is used to connect the camera to telescoping pole 34. Swivel joint 33 allows cameras 19 and 22 to be set and locked in at any angle between 0 and 180-degree from telescoping pole 34. The diameter of cameras 19 and 22 should be less than 2-in.

Figure 3:
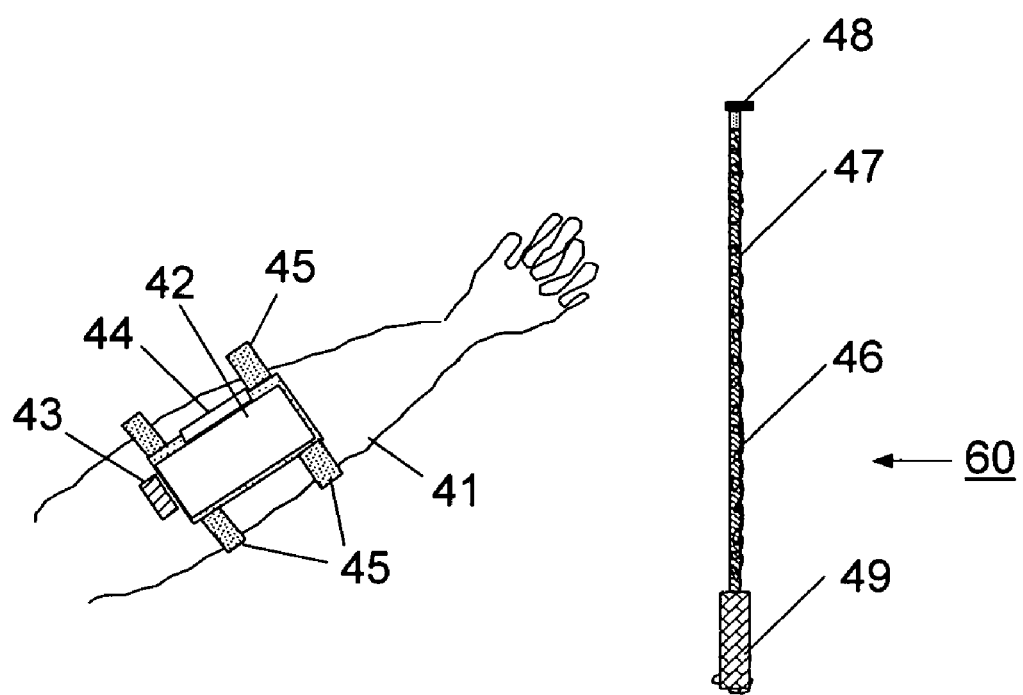
FIG. 3 is a schematic representation of an arm mount surveillance system in accordance with the present invention.

FIG. 3, depicts another alternative preferred embodiment of the arm mount surveillance system 60 of the present invention. As depicted in FIG. 3, system 60 is mounted on arm 41 of a user and comprises an LCD display (monitor) 42, a rechargeable battery 43, a recorder 44, and two Velcro straps 45. Velcro straps 45 should be long enough to go around forearm 41 of a user. The bottom surface of LCD display 42 also has two bands with Velcro. Thus, LCD display 42 can be placed and attached to the straps on the forearm instantly. Arm mount surveillance system 60 preferably includes a short pole 46 between 1 and 7 feet long. A section or the entire length of short pole 46 should be flexible so that the user can control his/her view in any direction and in any angle. Short pole 46 includes a camera 48 at one end and a handle 49 at another end. Camera 48 can be wireless or with electrical wire 47. In the case of wired system the electrical wire between handle 49 and display 42 should be between 3 and 7 feet. Excessive length should be avoided to prevent wire entanglement with other systems that a user might be wearing or using. The dimensions of LCD display 42 should be between 1 by 2-in and 6 by 12 inches, preferably between 1 by 2 and 3 by 6 inches.

Arm mount surveillance system 60 may use a long telescoping pole camera as in the case of a chest mount system. In this case the same criteria mentioned above apply.

It should be readily understood that LCD display 42 may be mounted on another portion of our body including the back of a hand. The attaching mechanism may also include rubber bands, transparent plastic wraps, strings, cloth with clips, and other convenient attachment mechanisms.

The following examples will serve to provide a better understanding of the invention.

EXAMPLE 1

We manufactured an enclosure for the LCD display of the chest mount surveillance system, element 11 of FIG. 1, from a polycarbonate sheet that was purchased from a local hardware store. It was cut according to a pattern and folded to form the shape of the enclosure. The edges were bonded using an adhesive. It was painted black. The dimensions of the LCD display are 3.5 by 6-in. The battery has a monitor that indicates the remaining power. The enclosure has two adjustable straps; one over the neck/shoulder and another goes around the back. They can be adjusted to securely hold in the chest area. A telescoping pole was manufactured from carbon fiber reinforced resin composite tubes. They are tapered and joined together in multiple sections. The total length is about 16-ft in its fully extended position. Since carbon fiber reinforced resin composite is black in color no painting was necessary. It can be painted with plain black color if desired. More sections of composite tubes can be assembled to reach as long as 40-ft for the telescoping pole. A compact wireless camera was attached to the end of the telescoping pole and became a telescoping pole camera.

One short flexible pole was attached to the LCD display (monitor). The entire pole is flexible except the handle. A compact camera was attached at the end of the pole. It has electrical wires passing through the hollow center of the flexible pole and connected to the LCP display. The electrical wires are controlled to between 3 and 7 feet from the end of the pole to the enclosure. The LCD display successfully received images from either pole camera in real time.

An enclosure was also successfully manufactured from thin sheets of aluminum alloys.

EXAMPLE 2

A sheet of elastomeric foam was purchased from a local gasket company. It was cut to the length and width that is just enough to wrap around the compact camera as shown in FIG. 2. The elastomeric foam is black in color. After wrapping the camera with the elastomeric foam it has a diameter slightly over 1-in. The camera is well protected from any impact loading. It incurred no damage when it dropped onto a hard floor.

EXAMPLE 3

We constructed an arm mount surveillance system based on the schematic shown in FIG. 3. An LCD display (monitor) was purchased from a local electronic store. It had dimensions of 2.0 by 3.7-in. The LCD display has a built-in recorder, battery charger, and battery monitor. A compact camera, purchased from a local camera store, was installed on top of a flexible pole about 3-ft long. It had electrical wires passing through the hollow center of the flexible pole and connected to the LCD display. We also constructed a wireless telescoping pole camera as mentioned in EXAMPLE 1. It was programmed to connect with the second receiver for the LCD display. The LCD display successfully received images from either pole camera in real time.

EXAMPLE 4

We repeated the construction of the arm mount surveillance system as described in EXAMPLE 3 with modifications to the short (flexible) pole camera. A wireless camera was used to replace the wired camera. A second rechargeable battery was packed and clipped on to a users belt as a backup power supply. This created a wireless arm mount surveillance system. We then applied this wireless short (flexible) pole camera to the LCD display of the chest mount unit. The chest mount surveillance system also became a wireless surveillance system.

There has thus been described a readily portable surveillance system that:
1. enables a user to see objects and activities at a distance of over 12-ft away without the concern of wire entanglement;
2. is lightweight;
3. is very compact;
4. enables a user to see objects and activities through gaps of windows and doors;
5. enables a user to see objects and activities under the low light conditions;
6. can be used for operation within tens of second to minutes;
7. allows user to see objects and activities in all directions and at wide angles; and
8. has recording capability.

As the invention has been described, it will be apparent to those skilled in the art that the same may be varied in many ways without departing from the spirit and scope of the invention. Any and all such modifications are intended to be included within the scope of the appended claims.

What is claimed is:

1. A portable surveillance system comprising:
   a) an arm-mountable compact LCD display;
   b) a telescoping pole having a hand graspable handle end and a remote end;
   c) a first camera at the remote end;
   d) a recorder; and
   e) batteries powering the compact display, the camera and the recorder, the first camera being operatively connected to the compact LCD display and the recorder.

2. The portable surveillance system of claim 1 further comprising a battery monitor in connection with said batteries.

3. The portable surveillance system of claim 1 further including: a short, at least partially flexible pole having a handle end and a remote end and a second camera at the remote end, the second camera being operatively connected to the LCD display via a wire.

4. The portable surveillance system of claim 3 wherein the first and second cameras are rotatably mounted on their respective telescoping and short flexible poles via a swivel joint that allows 180° rotation of the first and second cameras.

5. The portable surveillance system of claim 3 wherein said flexible pole comprises a rigid handle and a body; said body being fully flexible.

6. The portable surveillance system of claim 1, wherein the first camera is wirelessly connected to the LCD display.

7. The portable surveillance system of claim 3 wherein the first and second cameras are protected from external shock by a layer of impact resistant material.

8. The portable surveillance system of claim 1, wherein at least a portion of the telescoping pole is flexible.

9. The portable surveillance system of claim 1, wherein the telescoping pole and the short pole are manufactured from a material selected from the group consisting of carbon fiber reinforced resin composite, glass or aramid fiber reinforced resin composite, aluminum alloys, or any other lightweight metallic alloy or hybrid composite system involving metals, polymers, ceramics and intermetallics.

10. The portable surveillance system of claim 9 wherein the telescoping pole and the short pole are provided with a dark finish to inhibit reflection therefrom.

11. The portable surveillance system of claim 1 wherein said LCD has physical dimensions in the range of 1 by 2 inches and 3 by 6 inches and, further said LCD includes Velcro® mounting straps.

* * * * *